Oct. 4, 1927.
J. PALLAS, JR
1,644,201
COMBINED HOG LEADER AND CRATE
Filed April 19, 1926    3 Sheets-Sheet 1
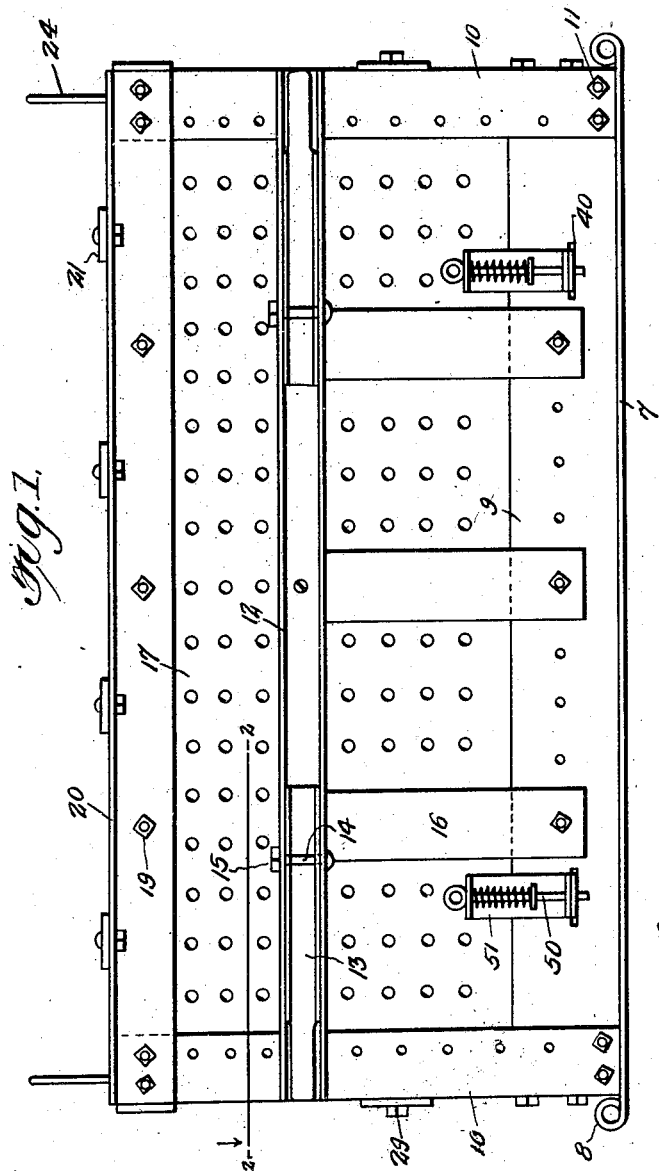
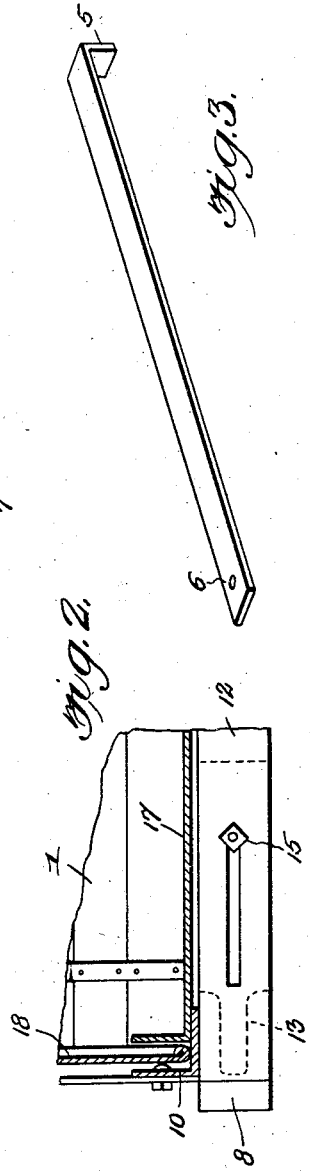
Inventor
John Pallas, Jr.
By Clarence A. O'Brien
Attorney Oct. 4, 1927.
J. PALLAS, JR
1,644,201
COMBINED HOG LEADER AND CRATE
Filed April 19, 1926
3 Sheets-Sheet 2
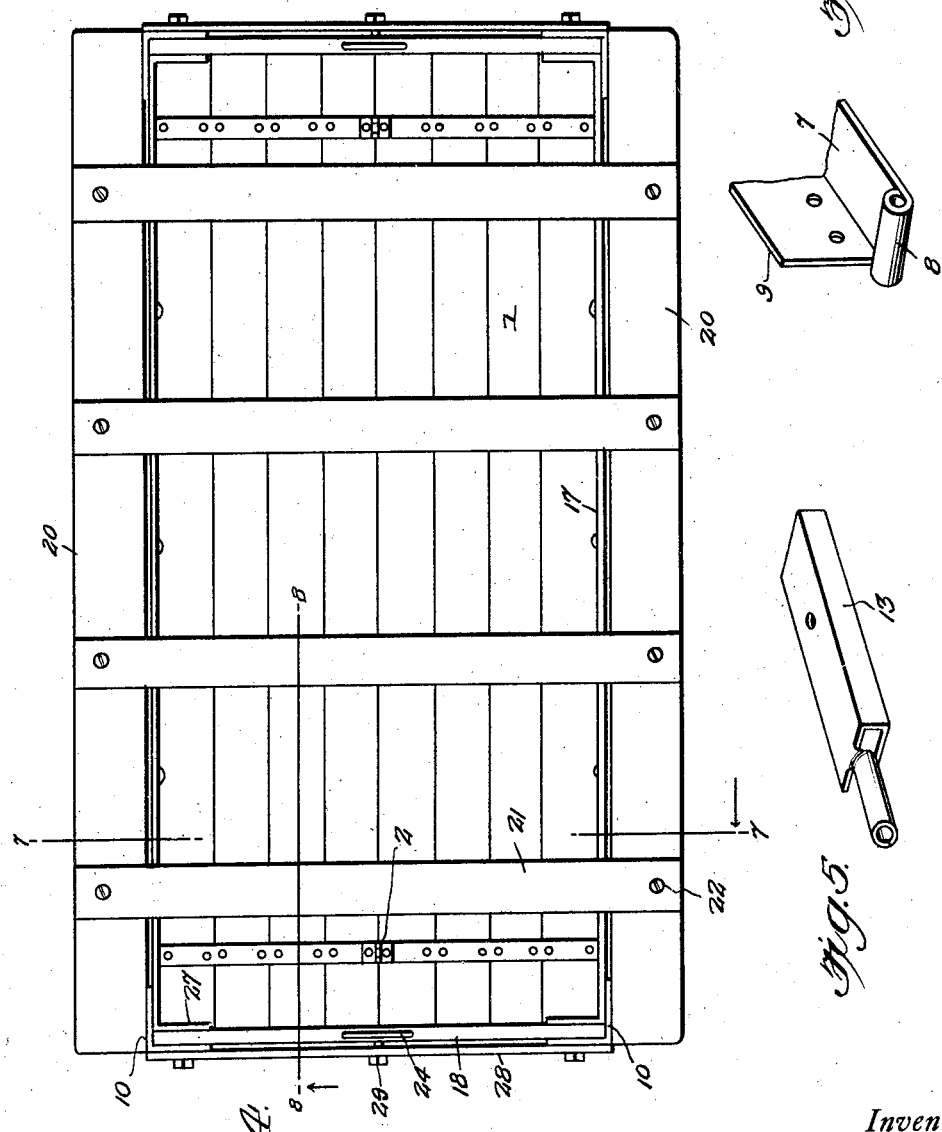
Inventor
John Pallas, Jr,
By Clarence A. O'Brien
Attorney Oct. 4, 1927.
J. PALLAS, JR
1,644,201
COMBINED HOG LEADER AND CRATE
Filed April 19, 1926
3 Sheets-Sheet 3
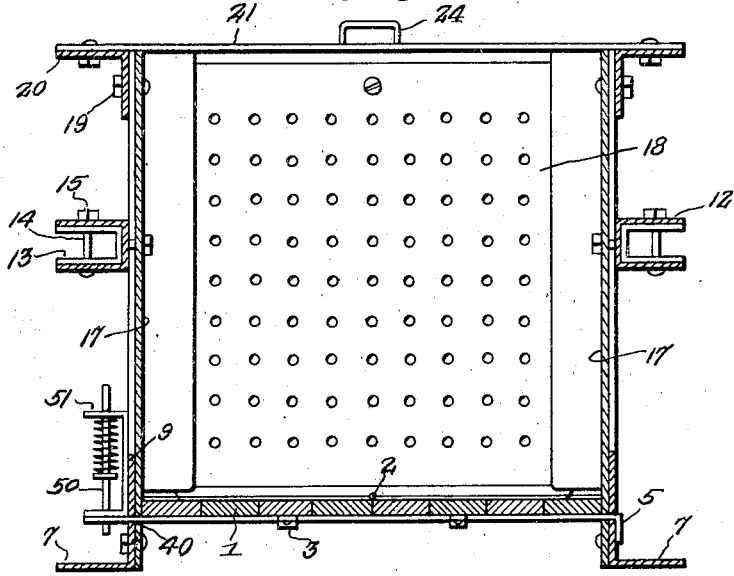
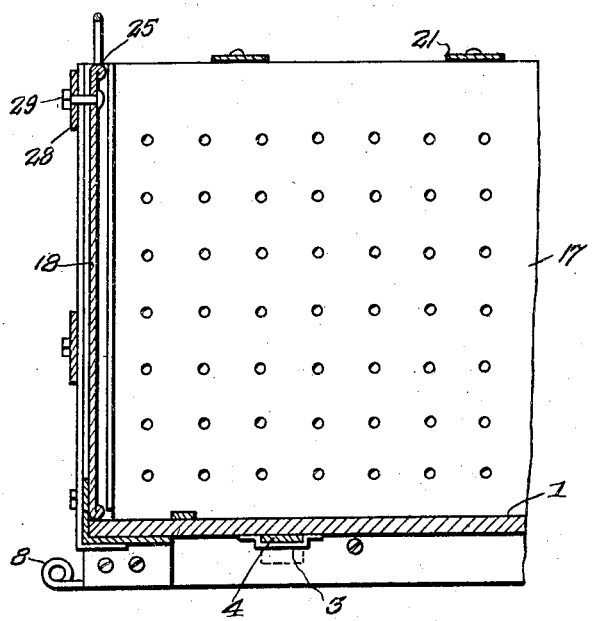
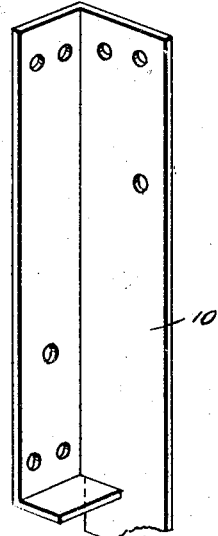
Inventor
John Pallas, Jr.
By Clarence A O'Brien
Attorney Patented Oct. 4, 1927.

1,644,201

UNITED STATES PATENT OFFICE.

JOHN PALLAS, JR., OF THURSTON, NEBRASKA.

COMBINED HOG LEADER AND CRATE.

Application filed April 19, 1926. Serial No. 103,170.

My present invention has to do with the convenient moving or leading and transportation of hogs, more particularly brood sows; and it contemplates the provision of a device of general crate character which may be used to advantage for leading a brood sow into an individual hog house or to any desired point, and which may also be used to advantage as a crate for the convenient movement of a brood sow or other hog from one place to another, and this in such manner that the liability of injuring the brood sow or other hog is reduced to a minimum.

With the foregoing in mind, my invention in all of its details will be fully understood from the following description and claims when the same are read in connection with the drawings, accompanying and forming part of this specification, in which:—

Figure 1 is a side elevation of the combined hog leader and crate constituting the preferred embodiment of my invention.

Figure 2 is a fragmentary horizontal section taken in the plane indicated by the line 2—2 of Figure 1, looking downwardly.

Figure 3 is a detail perspective of one of the cross bars for supporting the intermediate portion of the removable floor of the device.

Figure 4 is a top plan view of the complete device.

Figure 5 is a detail perspective of one of the handle bars of the device.

Figure 6 is a detail perspective showing the end portion of one of the runners of the device.

Figure 7 is a full vertical transverse section taken in the plane indicated by the line 7—7 of Figure 4.

Figure 8 is a fragmentary longitudinal vertical section taken in the plane indicated by the line 8—8 of Figure 4.

Figure 9 is a perspective showing one of the corner uprights of the device.

Similar numerals of reference designate corresponding parts in all of the views of the drawings.

Among other elements my novel device comprises a floor that is adapted to be conveniently removed and as readily replaced for reasons hereinafter set forth. The said floor is shown as formed by boards 1 extending longitudinally and arranged side by side and appropriately connected together and in the present and preferred embodiment of my invention the said floor comprises two side by side longitudinal sections hingedly connected as designated by 2 so that the floor may be flexed to facilitate the removal and the replacement of said floor.

At its underside the floor is provided with loops 3 for the passage of cross bars 4, each of the cross bars 4 having an angularly disposed pendent end portion 5 and being provided adjacent to its opposite end with a vertically disposed aperture 6.

In addition to the elements thus far named, the device comprises runners 7 spaced apart in parallel relation, Figures 1 and 7, and having upwardly curled ends 8 and also having inner upwardly extending longitudinal flanges 9. Uprights 10, Figures 1, 4 and 9, are bolted or otherwise fixedly connected at 11 to the flanges 9 of the runners 7. It will also be understood that longitudinal channel irons 12 are fixedly connected to and extended between the corner uprights 10, there being one of the channel irons 12 at each side of the device, Figure 7. Longitudinally extensible handles 13 are disposed and slidable longitudinally in the end portions of the channel irons 12, the said handles 13 being formed of metal or other appropriate material and being permanently connected with the channel irons 12 by bolts 14 which are movable in longitudinal slots in the upper and lower portions of the channel irons 12. It will also be noticed that the bolts 14 are equipped with nuts 15, of suitable type, and that when the nuts 15 are tightened the handle bars 13 will be adjustably fixed in the channel irons 12 in the idle positions shown in Figure 1, and that when the nuts 15 are loosened the handle bars 13 may be extended lengthwise from the ends of the major portion of the device and may be adjustably fixed in said extended positions by tightening of the nuts 15. Manifestly when extended and adjustably fixed as stated, the handle bars 13 constitute means through the medium of which men at opposite ends of the device may conveniently move or carry the device. Interposed between and connected with each of the runner members 7 and each channel iron 12 are three, more or less, upright braces or bars 16, the said bars 16 being arranged at the outer side of the side walls 17 of the device, which side walls 17 as well as the end doors 18 are provided with openings as shown for the free circulation of air. Adjacent to their upper edges, the side walls 17 are connected at 19 with the pendent portions of longitudinal crown bars 20, which longitudinal crown bars 20 are of right angle form in cross section and are connected at intervals in the length thereof through the medium of bars 21 arranged transversely and connected at 22 to the crown bars, as best shown in Figures 1, 4 and 7.

The end doors 18 of the device are equipped with handles 24 and are preferably formed of sheet metal with beaded or rolled edges 25, Figure 8, and are slidable in vertically disposed guides 27 provided at the ends of the device as best shown in Figure 4. At the ends of the device cross bars 28 are connected to the corner uprights 10 and when it is desired to secure the end doors 18 in closed positions, bolts 29 are arranged in the end doors 18 and the upper cross bars 28 as positively shown in Figure 8. Manifestly when either of the doors 18 is to be removed, its bolt 29 must be displaced as a condition precedent to the upward rectilinear movement of the door 18, and it will also be noticed in this connection that when one of the doors 18 is dropped in the guides 27 to closed position, it may be readily secured in said position by its respective bolt 29.

The cross bars 4 before alluded to have their apertured end portions removably arranged in slots 40 in one of the flanges 9, and it will also be noted that vertically disposed spring-pressed pins 50 are mounted in brackets 51 on the said flange 9 and adapted when disposed in the apertures 6 of the bars 4 to detachably though securely hold the said bars 4 in working position. When, however, the pins 50 are moved upwardly and out of engagement with the bars 4, the said bars 4 may be readily withdrawn from the device to release the removable floor, after which the said floor may be quickly and easily removed from between the side walls 17.

When it is desired to use my novel device for leading brood sows into individual hog houses or to any other desired point, both doors 18 are removed and the floor of the device is also removed after which the end doors 18 are replaced in the device, and the handle bars 13 are adjustably fixed in extended positions for the convenient handling of the device after which the device is raised and then lowered over the hog. With this done, the sow or hog can be led to any point desired, it being understood in this connection that the hog will walk forwardly or backwardly as the device is moved by the operator, and it will also be understood that in the manner stated the hog may be led or moved in such manner that there is no liability of the hog being excited or injured. When the device is to be used to carry a hog a considerable distance, one of the end doors 18 is removed while the floor of the device is in working position, and the hog is run into the device after which the said end door 18 is replaced and secured in closed position.

Manifestly my novel device may be used to advantage as a hog leader or mover or a hog crate; the floor of the device being susceptible of ready removal and being also susceptible of ready replacement and fixture in working position upon the cross bars 4 which are detachably secured in position in the manner before described in detail.

It will also be apparent from the foregoing that as a whole my novel crate is adapted to withstand rough usage, and that when the device is used as a crate the handle bars 13 may be nested in the channel irons 12 so as to be out of the way and not liable to be broken, and then when it is desired to handle the crate or device through the medium of the handle bars 13, the said handle bars 13 may be extended to working position and adjustably fixed in said position.

I have entered into a detailed description of the construction and relative arrangement of the parts embraced in the present and preferred embodiment of my invention in order to impart an exact, clear and full understanding of the said embodiment. I do not desire, however, to be understood as limiting myself to the precise structure illustrated and described, my invention being defined by my appended claims within the scope of which modifications may be made without departure from my invention.

Having thus described my invention, what I claim as new is:—

1. A device of crate character comprising spaced side portions, a removable floor, disposed between said side portions, said floor composed of side by side sections flexibly connected together and having loops at its under side, transverse bars removably arranged within and extending between the side portions and also extending through the loops on the floor, and means appurtenant to one side portion for engaging said bars and detachably securing the same in working position.

2. A device of crate character comprising spaced side portions, a removable floor, disposed between said side portions, said floor having loops at its under side, transverse bars removably arranged against the floor and extending between the side portions and also extending through the loops on the floor, means appurtenant to one side portion for engaging said bars and detachably securing the same in working position; the said bars each having an enlargement at one end adapted to bring up against one side portion and also having an aperture adjacent its opposite end and the said detachably securing means being in the form of spring pressed pins disposed and movable in brackets on one side portion and adapted to occupy the apertures in the cross bars.

3. A combined hog leader and crate comprising rigid side portions, said portions having vertically disposed guides at their ends, end door removably arranged in said guides, intermediate cross bars interposed between and connecting the upper edge portions of said side portions, corner uprights fixed to the side portions and having floor supports, a removable floor superposed upon said supports and arranged between the side portions, said floor having loops at its under side, removable cross bars extending through said loops and also extending through apertures in the side portions, and spring pressed latches carried by the side portions and adapted to detachably secure said cross bars in working position.

4. A combined leader and crate comprising rigid side portions, said portions having vertically disposed guides at their ends, end doors removably arranged in said guides, intermediate cross bars interposed between and connecting the upper edge portions of the said side portions, corner uprights fixed to the side portions and having floor supports, a removable floor superposed upon said support and arranged between the side portions, said floor having loops at the under side, removable cross bars extending through said loops and also extending through apertures in the side portions, and spring pressed latches carried by the side portions and adapted to detachably secure said cross bars in working position; the said floor being formed of sections hingedly connected together to facilitate removal and replacement of the floor.

In testimony whereof I affix my signature

JOHN PALLAS, Jr.